July 4, 1939.  S. M. NAMPA  2,164,661
CAR LOADING DEVICE
Filed Oct. 26, 1935
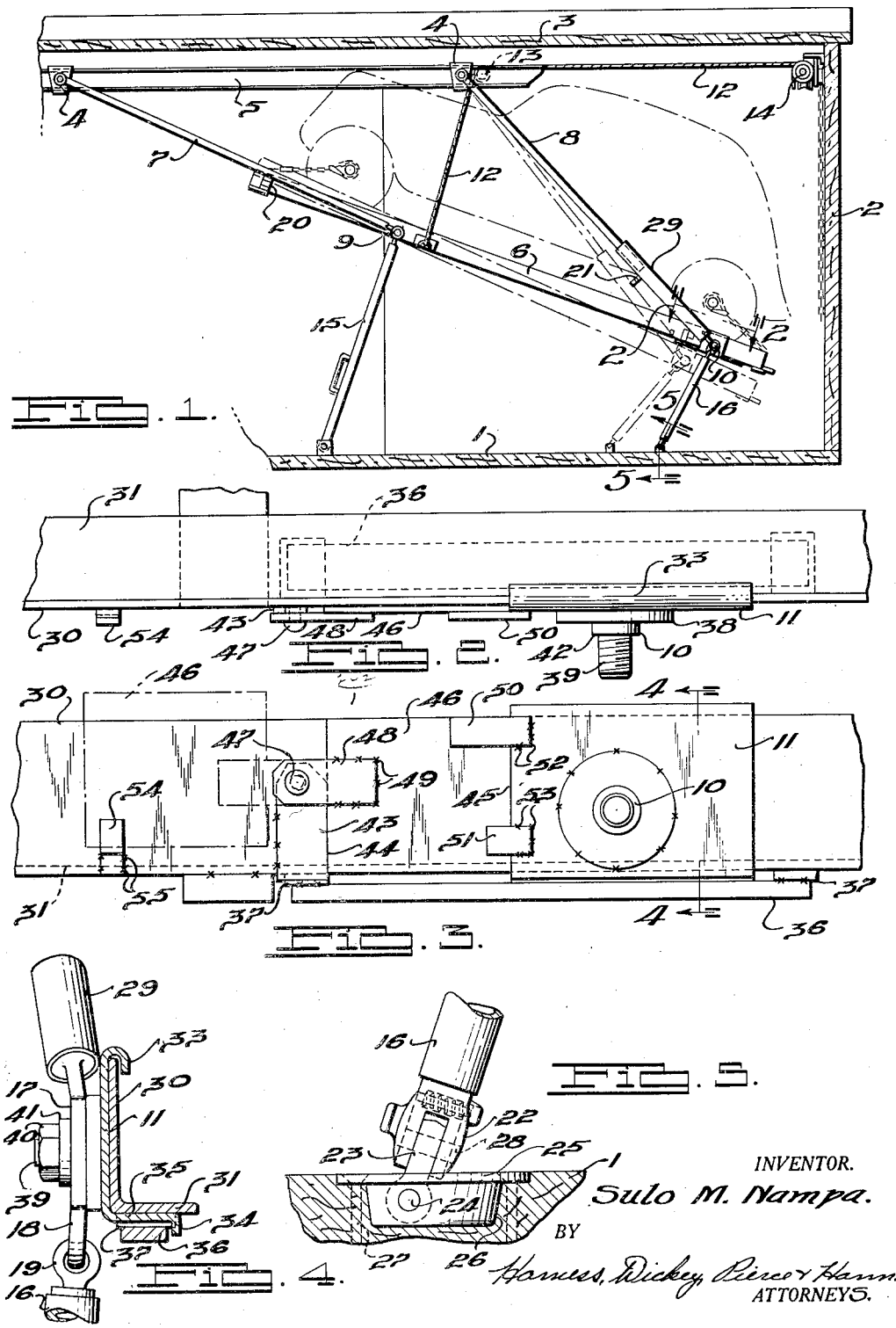
INVENTOR.
Sulo M. Nampa.
BY
Harness, Dickey, Pierce & Hann.
ATTORNEYS.

Patented July 4, 1939

2,164,661

UNITED STATES PATENT OFFICE 2,164,661

CAR LOADING DEVICE

Sulo M. Nampa, Detroit, Mich., assignor to The Worth Company, a corporation of Michigan Application October 26, 1935, Serial No. 46,851

16 Claims. (Cl. 105—368)

This invention relates to car loading devices of the type in common use for transporting automobiles in a freight car in a semi-decking position.

This type of car loading device is disclosed in the co-pending application of Samuel D. Butterworth, Serial No. 646,830, filed December 12, 1932, and assigned to the same assignee as is the present application. The present invention resides in certain improvements on the structure therein disclosed.

The principal object of this invention is to provide means for adjusting the elevated inclined or semi-decking position of the loading frame to accommodate automobiles of varying sizes.

Another object is to provide an adjustable supporting means for the frame adapted to permit the loading of a larger number of small automobiles in the car than would otherwise be possible.

A more specific object is to secure the desired adjustability by providing an adjustable connection between the frame and the frame carrying link or supporting member.

A further object is to provide an adjusting device of the type mentioned which is simple and rugged in construction, easy to operate and is semi-automatic in operation.

Other objects and advantages will appear from the following description, the drawing appended hereto, and the claims.

A preferred form of the invention is disclosed in the drawing, in which:

Fig. 1 is a longitudinal section through a freight car showing the loading device in semi-decking position;

Fig. 2 is a partial plan view of the frame adjusting means, taken on the line 2—2 of Fig. 1;

Fig. 3 is a partial elevation of the adjusting connection shown in Fig. 2.

Fig. 4 is a section taken on the line 4—4 of Fig. 3; and

Fig. 5 shows a section taken on line 5—5 of Fig. 1 of a means for connecting one of the supporting posts to the floor of the freight car.

Referring to the drawing, Fig. 1 shows in section one end of a conventional freight car having, a floor 1, an end wall 2, and a roof 3. At opposite sides of the car adjacent the roof thereof are secured a pair of trunnion supporting brackets 4 fastened permanently in place by any suitable means, such as welding or otherwise, to a longitudinal frame member 5. The loading frame, indicated generally at 6, is connected to the car by four swinging arms or rods connected adjacent the four corners of the frame. Fig. 1, illustrates the rods for one side of the frame, including a forward rod 7 and a rear rod 8; and like supporting members are located on the opposite side of the frame. Forward rods 7 are pivoted to the frame at 9 while rearward rods 8 are pivoted to a trunnion member 10 carried by an adjustable plate 11 to be described later in detail.

As the result of the structure described, frame 6 may be swung into loading position adjacent the floor of the car, at which time front rods 7 will incline rearwardly while rear rods 8 will be substantially vertical. Cables 12, which pass over fixed pulleys 13 adjacent the roof of the car, are secured to the frame member and are adapted when wound on drums 14 to elevate the frame into the semi-decking position shown in Fig. 1. At this time the rearward rods 8 are under tension only.

To relieve the tension load on the cables and rods, removable strut members 15 and 16 are connected in place between the floor and the frame. These struts are connected to the frame by means of eye 18 on the pivot eye 17 of the rods 7 and 8, as shown in Fig. 4. The struts are provided with eye members 19 engageable with eyes 18 for this purpose. When not in use, the struts are released from the floor and engaged with hooks 20 or 21 on rods 7 and 8 respectively.

A releasable connection, as shown in Fig. 5, is provided between the struts and the floor of the car. The form illustrated is that disclosed in the co-pending joint application of Samuel D. Butterworth and Sulo M. Nampa, Serial No. 743,372, filed September 10, 1934. Briefly, this connection comprises a clevis 22 secured to the end of the strut 15 or 16 and engageable with a link 23 which in turn is pivoted at 24 to a floor pocket member 25. Member 25 is positioned within a pocket 26 in the floor of the car and is secured in place by any suitable means, such as bolts 27. Passing through aligned bores in the arms of clevis 22 and link 23 is a pin 28 which is removable to disconnect the strut from the floor. Upon removal of pin 28, link 23 may be swung below the floor level into a suitable recess 25.

When it is desired to use the freight car for other purposes than transporting automobiles, the frame may be swung into juxtaposition with the roof of the car where it will not interfere with normal use of the car. This is accomplished by winding additional lengths of cables 12 on drums 14 until the frame is elevated from the position shown in Fig. 1 to a position parallel with and in proximity to the roof of the car. To permit this movement, rear rods 8 are provided with a telescopic section 29. In the position shown in Fig. 1, the two telescopic sections 8 and 29 of the rear rod have reached the limit of their extensibility, and hence in this position the telescopic rod supports the rear end of the loading frame by tension. However, when the frame is elevated further into position adjacent the roof, these two sections slide one upon the other to shorten their effective combined length.

It has been found that for a large size automobile, the proportions of the frame and supporting linkages must be such as to support the frame in a position corresponding to that illustrated in dotted lines in Fig. 1. When so supported, however, it is possible to load only four automobiles in a freight car, two at the ends, elevated in the position indicated in the drawing, and two between and facing the ends and positioned below the two loading frames, respectively. With the frames in that position it has been found that even when loading smaller automobiles, only four automobiles constitute the capacity of the car, due to the fact that the relatively low position of the end of the loading frame 6 limits the proximity of the car on the floor level to the end of the car. However, by elevating the rear end of the frame as shown in solid lines in Fig. 1, sufficient room is made available beneath the frame to permit the loading of either three small cars or two large ones between the two cars which are transported in elevated position at the ends of the car. This additional elevation of the rear end of the loading frame is permissible where the car positioned thereon is either quite low or is sufficiently short so that it can be moved rearwardly on the frame to free the front end thereof from the roof.

In order to provide for this additional adjustment of the semi-decking position of the frame, I have provided a rugged, simple and readily operated means for adjusting the location of the pivotal connection between rod 8 and frame 30, longitudinally of the frame. This structure is best shown in Figs. 2, 3 and 4 wherein 30 indicates one of the longitudinally extending frame members having a horizontally extending flange 31. A trunnion-carrying slide member 11 having a horizontal flange 35 is positioned in face-to-face contact with the side of frame member 30 with its horizontal flange underlying flange 31 of the frame member, as best shown in Fig. 4, and is held in that position with freedom for longitudinal sliding movement on the frame by means of a bent-over portion 33, and a downwardly directed flange 34 on horizontal flange 35. A retaining bar 36 is integrally secured in spaced relation to the underside of flange 31 by welding the same at its end to a pair of blocks 37, which in turn are likewise welded to the underside of frame member 31. The retaining member 36 and blocks 37, together with flange 31 of the frame member 30, define a longitudinally extending slot for reception of the horizontal flange 35 of the slide trunnion member 11, and the downwardly extending flange 34 of the side member is engageable with the retaining bar 36 to prevent lateral displacement of the slide member. Welded to slide member 11 is a plate or boss 38 to which is integrally secured by welding or otherwise a trunnion member 10 having a threaded outward extremity 39 for the reception of nut 40 and washer 41. In assembling the device, eye 17 on the lower end of extensible rod 8, 29 is journaled on the trunnion 10 and held in place by washer 41 which abuts the shoulder 42 on the trunnion and is held in place by the nut 40.

As previously indicated, upon elevation of the frame 6 in the car, rods 8 are placed in tension, thus urging trunnion 10 and slide member 32 to the left as viewed in Figs. 1, 2 and 3. Means are provided for selectively limiting the movement of the slide member in this direction to one of two positions in order to vary the semi-decking position of the frame. This means includes a stop member 43 welded to the side of frame member 30 and presenting a face 44 adapted to abut the adjacent face 45 of slide member 11 and prevent further forward movement thereof. When slide member 11 abuts stop 43 the frame will be elevated to its lower semi-decking position indicated in dotted lines in Fig. 1.

Means are provided for selectively limiting the forward movement of slide member 11 before it abuts stop 43. This means comprises a plate 46 pivotally secured to the frame by means of a tongue member 48 which is welded to plate 46 as at 49, and carries a suitable opening for the reception of a rivet 47 carried by the stop member 43. As a result of its pivotal connection to the frame, plate 46 may be swung from its inoperative position shown in dotted lines in Fig. 3, to the position shown in solid lines in that figure. In the latter position, it limits the forward sliding motion of trunnion member 11 to the point shown in Figs. 2 and 3, with the result that upon elevation of the frame to semi-decking position it will assume the more elevated position shown in full lines in Fig. 1.

Plate 46 is so formed that when swung into the operative position shown in solid lines in Figs. 2 and 3, its forward edge will abut stop member 43 at 44, thus relieving rivet 47 of the load caused by the tendency of slide member 11 to move forwardly. Suitable fingers 50 and 51 are welded as at 52 and 53, respectively, to the slide member 11 for the purpose of guiding plate 46 into proper register with the abutting edge 45 of the slide member 11 and preventing lateral displacement of the plate from that edge. A bracket 54 is welded to frame 30 as at 55 and is adapted to retain plate 46 in its inoperative position.

In operation, frame 6 is lowered to its loading position on the floor of the car, whereupon the slide trunnion member 11 may be moved to either of its selected positions before the automobile is rolled onto the frame. If it is desired to elevate the automobile into the higher of the two semi-decking positions, slide member 11 is moved rearwardly on the frame and pivoted plate 46 swung to the position shown in solid lines in Fig. 3, whereupon the automobile may be loaded and the frame elevated in the usual manner. No other adjustments or operations are required, except to insert strut member 16 in the appropriate pocket 25, after the frame is elevated.

As is apparent from the above description and the accompanying drawing, I have provided an exceedingly simple, rugged and effective means for varying the semi-decking position of an automobile loading frame. However, I do not wish to be limited to the specific structure shown since it is apparent that many modifications thereof could be made within the spirit of this application and the appended claims.

I claim:

1. The combination with a freight car of an automobile loading frame, a member fixed with respect to said car, a tension member swingably connecting the said frame with said first member for movement of said frame into a decking position, means to fix the point of connection between said tension member and said frame at any one of a plurality of points for varying the path of movement and the decking position of the frame, and means to effect said movement of the frame into said decking position.

2. The combination with a freight car of an automobile loading frame, a member fixed with respect to the car, a tension member swingably connecting the frame with said first member for movement of said frame into a decking position, and means to fix the point of connection between said tension member and frame at any one of a plurality of points along the latter for varying the path of movement and the decking position of said frame, and means to effect said movement of the frame into said decking position.

3. The combination with a freight car, of an automobile loading frame, a member fixed with respect to the car, a second member slidably engaged with said frame, means connecting said members for relative swinging movement, means to hold said second member in any one of a plurality of adjusted positions on said frame for varying the path of swinging movement of said frame, and means for effecting movement of said frame in said path.

4. The combination with a frieght car, of an automobile loading frame, a member fixed with respect to the car, a second member slidably engaged with said frame, tension means for connecting said members for relative swinging movement, means to hold said second member in any one of a plurality of adjusted positions on said frame for varying the path of swinging movement of said frame, and means for swinging said frame in said path.

5. The combination with a frieght car, of an automobile loading frame, a member slidably connected with said frame, a second member pivotally connecting said car with said first named member, and means carried by the frame for holding said first member in any one of several adjusted positions on said frame.

6. The combination with a freight car, of an automobile loading frame, a member connected to the frame for longitudinal movement thereon, tension means connecting said member to said car for longitudinal swinging movement, and means to hold said member in any one of a plurality of positions on said frame.

7. The combination with a freight car, of an automobile loading frame having longitudinally extending frame members, a member having a longitudinal sliding engagement with one of said frame members, a stationary stop on said frame member adapted to restrict movement of said sliding member in one direction, a movable stop device pivoted to said frame for swinging movement into or out of position between said sliding member and said stationary stop for further restricting movement of said sliding member in said one direction, means connecting said frame to the car for movement into a decking position including a member connecting said sliding member to said car and adapted to urge said sliding member into engagement with one of said stops, and means for effecting said movement of the frame into said decking position.

8. In combination with a freight car, of an automobile loading device including a frame adapted to receive and support an automobile, means connecting said frame to the car for longitudinally swinging movement from a position on the floor of said car to an elevated decking position, said means providing a lost motion connection between said car and said frame, means for adjusting the amount of lost motion in said first mentioned means for varying the path of movement and the decking position of said frame, and means for swinging said frame longitudinally of said car into said decking position.

9. The combination with a freight car of an automobile loading frame, means connecting said frame to said car for movement of the frame to a decking position, said means including an element connected to the freight car for movement fore and aft therein and connected to the frame, means for adjusting the point of connection between said element and said frame longitudinally of the freight car and relative to said frame for varying the decking position of the frame, and means for effecting said movement of the frame into said decking position.

10. The combination with a freight car of an automobile loading frame, a fixed elevated pivotal support for one end of the frame about which frame may rotate, a trunnion element mounted for bodily swinging movement longitudinally and upwardly in the car, and means for connecting said trunnion element to the opposite end of said frame at any one of a plurality of points along the frame for varying the elevation of said opposite end of the frame.

11. The combination with a freight car of an automobile loading frame, and means for supporting said frame in elevated position in said car, said means comprising a pivotal support for one end of the frame and an adjustable support for the opposite end of the frame, said adjustable support including a telescoping tension member pivotally connected to the car above said elevated position of the frame and connected to said opposite end of the frame, said adjustable support being adapted to support said opposite end of the frame in any one of a plurality of positions with said telescopic member acting in tension.

12. The combination with a freight car of an automobile loading frame, and means for supporting said frame in elevated position in said car, said means comprising a pivotal support for one end of the frame and an adjustable support for the opposite end of the frame, said adjustable support including a telescopic rod pivotally connected at one end to the car at a point above said elevated position of the frame and pivotally connected to said opposite end of the frame, said telescopic rod having means to limit its extensibility whereby said rod acts in tension to support the frame, and means for adjusting the point of connection between said rod and frame with respect to one of them to vary the elevated position of said opposite end of the frame without collapsing said rod.

13. The combination with a freight car of an automobile loading frame, and means for supporting said frame in elevated position in said car, said means comprising a pivotal support for one end of the frame and an adjustable support for the opposite end of the frame, said adjustable support including a telescopic rod pivotally connected at one end to the car at a point above said elevated position of the frame and pivotally connected to said opposite end of the frame, said telescopic rod having means to limit its extensibility whereby said rod acts in tension to support the frame, and means for adjusting the point of connection between said rod and frame along said frame to vary the elevated position of said opposite end of the frame without collapsing said rod.

14. The combination with a freight car having a floor and roof of an automobile loading frame, a rigid link pivotally connected at one end to the upper part of said car and at its opposite end to one end of said frame, a telescopic link pivotally connected at one end to the upper part of the car and at its opposite end to the opposite end of said frame, said links being adapted to guide said frame for swinging movement from a position on the floor of the car to an elevated semi-decking position and upon collapse of said telescopic link to a position adjacent and parallel to the roof of the car, means for elevating said frame, and means for adjusting the point of connection between said telescopic link and said frame with respect to one of them for varying the semi-decking position of said opposite end of the frame independently of the first mentioned end of the frame and without collapsing said telescopic rod.

15. The combination with a freight car having a floor and roof of an automobile loading frame, a rigid link pivotally connected at one end to the upper part of said car and at its opposite end to one end of said frame, a telescopic link pivotally connected at one end to the upper part of the car and at its opposite end to the opposite end of said frame, said links being adapted to guide said frame for swinging movement from a position on the floor of the car to an elevated semi-decking position and upon collapse of said telescopic link to a position adjacent and parallel to the roof of the car, means for elevating said frame, and means for adjusting the point of connection between said telescopic link and said frame along the frame for varying the semi-decking position of said opposite end of the frame independently of the first mentioned end of the frame and without collapsing said telescopic rod.

16. The combination with a freight car having a floor and roof of an automobile loading frame, a rigid link pivotally connected at one end to the upper part of said car and at its opposite end to one end of the frame, a member slidable longitudinally upon the frame at its opposite end, a telescopic link pivotally connected at one end to the upper part of the car and at its opposite end to said slidable member, said links being adapted to guide said frame for swinging movement from a position on the floor of the car to an elevated semi-decking position with said telescopic rod being in tension, and upon collapse of said telescopic rod from said semi-decking position to a position adjacent and parallel to the roof of the car, an abutment engageable by said slidable member for limiting movement thereof in response to tension exerted by said telescopic rod during elevation of said frame, and a second abutment movably carried by said frame and movable into a position to further limit movement of said member in the same direction whereby the semi-decking position of said opposite end of the frame may be varied independently of the first mentioned end of the frame without collapsing said rod.

SULO M. NAMPA.